June 15, 1943.  C. G. BUTLER  2,321,991
METHOD OF ATTACHING HOSE COUPLINGS
Original Filed Sept. 26, 1939
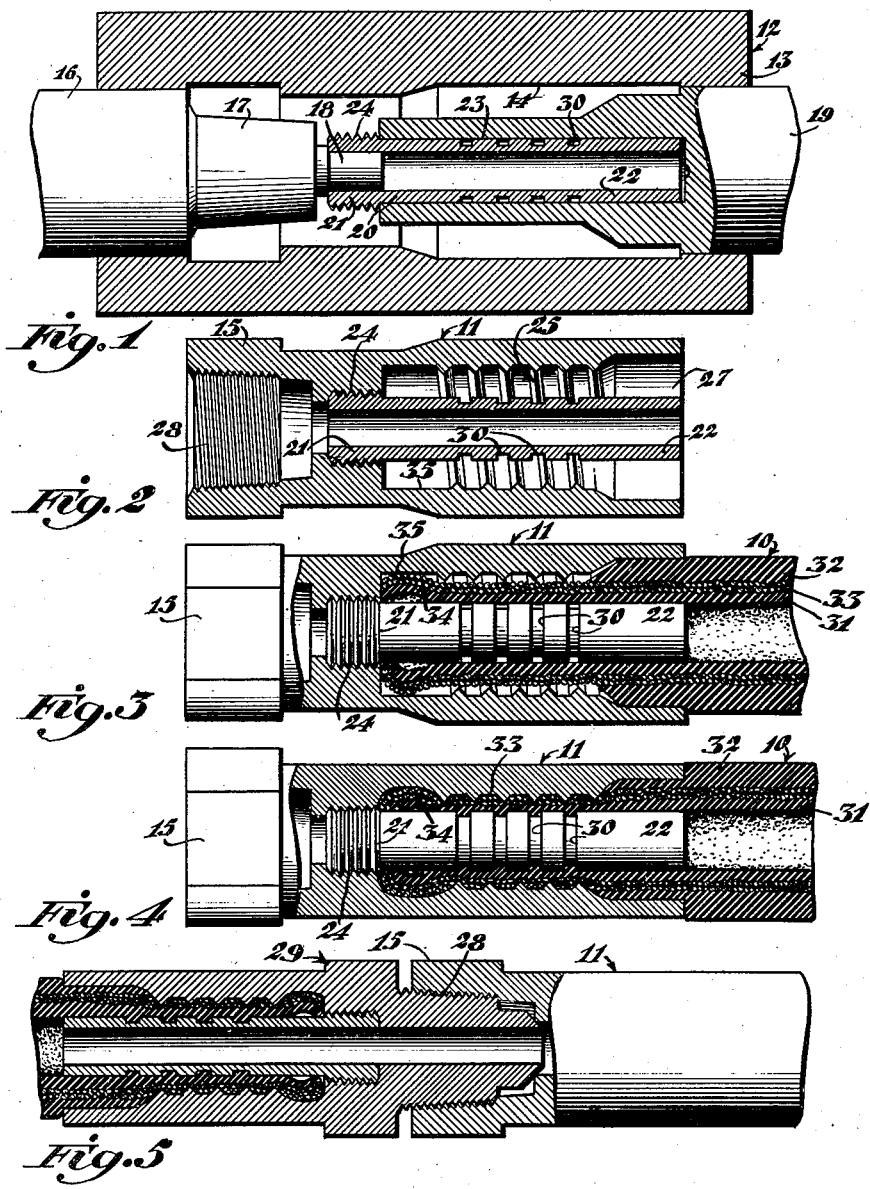
INVENTOR.
BY Clyde D. Butler
Wood & Wood ATTORNEYS Patented June 15, 1943

2,321,991

UNITED STATES PATENT OFFICE 2,321,991

METHOD OF ATTACHING HOSE COUPLINGS

Clyde G. Butler, Cincinnati, Ohio, assignor to The Cincinnati Ball Crank Company, Cincinnati, Ohio, a corporation of Ohio Original application September 26, 1939, Serial No. 296,641. Divided and this application December 12, 1940, Serial No. 369,850

1 Claim. (Cl. 29—88.2)

This invention relates to fittings of the type adapted to be attached to the end of hose formed of rubber or other compressible material. More particularly the invention relates to a method of attaching the coupling to the end of the hose. The coupling concerned here my be said to include a central nipple and an outer sleeve, coaxial with the nipple, forming an annular chamber adapted to receive the end of the hose, whereby the nipple is disposed within the hose, and the sleeve surrounds the hose.

A great many patents have been issued on couplings of this general construction but these have not provided joints with the hose which would withstand the high pressure to which they are subjected in modern usage. The pressures in use range between five and ten thousand or more pounds per square inch and the test pressures up to twenty thousand pounds. Furthermore, the couplings have been expensive and have required extreme care and the appliance of high pressure in the process of attachment to the hose.

It has been the object of the inventor to provide a method of attaching the coupling to the hose wherein the interior rubber lining of the hose is not disrupted so that an effective seal exists along the irregular surface of the nipple and wherein the wire braiding within the rubber wall of the hose is in direct engagement with the irregular inner wall of the outer sleeve providing a connection preventing outward displacement of the hose under high pressure conditions. The combination therefore provides an inner rubber to metal seal and an outer metal to metal connection.

The outer sleeve may be die cast of a zinc alloy having sufficient tensile strength for the purposes of strength and, the proper ductility for permitting swaging upon the hose. The nipple includes annular grooves at its inner attachment end into which the metal is die cast for a rigid connection. Each groove also functions as a dam against leakage. The metal is forced into the mold at a pressure of approximately two thousand pounds per square inch and thereafter shrinks upon the nipple to constitute an extremely tight and substantially integral connection.

The method of forming the coupling element per se, wherein the coupling includes a die cast outer sleeve, cast upon the nipple, is disclosed and claimed in the application of which this application is divisional. The copending, original application bears Serial No. 296,641 and was filed September 26, 1939, issued June 2, 1942 as Patent No. 2,285,014 for the method of forming a coupling.

It has been discovered that it is a mistake to apply high swaging pressure to the outer sleeve. In this improved coupling, the pressure used is just sufficient to press the grooved inner wall of the outer sleeve into the exposed wire braiding of the hose for a tight connection. Care is taken not to break or cut the inner rubber lining of the hose. It is forced, however, into the annular grooves of the nipple and constitutes a continuous rubber seal, preferably including a series of dams resulting from the rubber pressed into the grooves. There is no opportunity for the fluid passing through the hose to pass between the nipple and hose wall.

The coupling shown and described in this application is disclosed and claimed in a copending application filed on September 26, 1939, Serial No. 296,642.

Other objects and certain advantages will be more fully set forth in the description of the accompanying drawing in which:

Figure 1 is a sectional view of the assembled elements of the die casting mold.

Figure 2 is a longitudinal sectional view of the die cast coupling.

Figure 3 is a sectional view of the die cast coupling, showing it in position to be fixed on the end of the hose.

Figure 4 is a view taken similarly to Figure 3 but showing the coupling swaged in position on the hose.

Figure 5 is a longitudinal sectional view of the coupling, showing the coupling connected to the part to which it couples the hose.

Referring to the drawing, the hose is generally indicated at 10 and the coupling at 11. As shown in Figure 1, the mold 12 is adapted to die cast the outer sleeve portion on the nipple.

The mold consists of three parts. The outer mold element 13 provides a substantially cylindrical chamber 14 providing the outer contour for the coupling including the usual head 15 adapted to be engaged by a wrench for screwing the coupling to the fitting or the adjacent hose section. An end mold element 16 plugs one end of the mold casing 13 and provides a tapered plug portion 17 in the mold cavity and a stud 18. All these members are in axial alignment. The other end of the mold cavity is closed by means of a mold element 19 also in the form of a plug. This element provides an interior extension of decreasing diameter and therefore spaced from the interior wall of the mold casing 13 to constitute, in conjunction with the plug portion 17, the space into which the die cast metal is poured and pressed.

The nipple 20 of the coupling is supported between the stud 18 and the element 19. The nipple is tubular and has its head end 21 fitting over the stud 18 and the remainder or shank portion 22 telescoped in the bore 23 of the mold element 19. The head end of the nipple is provided with annular grooves 24 of V-form. This head is exposed in the mold cavity and the die cast metal therefore is imbedded in the grooves and solidly attaches to the head. The metal is driven into the cavity at a pressure of two thousand pounds per square inch so that no porosity occurs. As the metal cools, it shrinks upon the head and the joint is exceedingly tight and leakproof, in fact, the parts are substantially integral.

Now referring to Figure 2, the die cast sleeve portion is screw-threaded as at 25. The coupling is tapped after it has been die cast to provide these threads 25. These screw threads have a flat bottom and are provided along an intermediate portion. The annular recess 27 which receives the end of the hose is large enough to admit the hose end merely by the operation of hand pressing and screwing the parts together as shown in Figure 3. Also, the attachment end of the coupling is tapped as at 28 for receiving the attachment nipple 29 (Figure 5) of the adjoining coupling. The nipple 20 includes a series of annular grooves 30 opposite the screw threading 25.

The hose preferably used is essentially of rubber providing inner and outer layers of rubber indicated at 31 and 32 respectively, and an intermediate layer 33 of wire braiding. The outer layer of rubber 32 is stripped from the end of the hose engaging the screw threading 25 so that the screw threading is in direct contact with the wire braiding. The sleeve portion of the coupling, as initially formed, increases in diameter over the extent of the screw threading to the hose receiving end thereof. When the swaging is performed, the portion of increased diameter is pressed toward the nipple upon the hose (Figure 4). This leaves the outer surface of the coupling perfectly straight. The extremely inner end of the hose is subjected to very little pressure and forms a knob-like end 34 contained in the inner recess 35.

Now, the amount of pressure applied and the ultimate spacing of the inner wall of the sleeve and the nipple are selected as to preclude rupture of the inner lining of rubber. The die cast zinc alloy metal is sufficiently ductile so as to be readily formable and imbeds itself in the wire braiding along the screw-threading. The screw-threads are flat bottomed threads, and readily receive the wire braiding because they are of shallow depth. The rubber lining enters the annular grooves 30.

The condition provided may be described as a series of dams. As stated, the inventor has discovered that it is necessary to apply only sufficient pressure for tightly gripping the hose end. The continuous seal afforded by the rubber lining prevents the escape of the liquid under pressure along the wall of the nipple to the extremely inner end of the hose. As the liquid under pressure cannot reach the cavity 35, there is no tendency to force the hose out of the coupling. In this fact lies the effectiveness of attachment. The engagement of the screw-threading and the wire braiding is sufficient to prevent displacement of the hose from the coupling in the absence of leakage to the chamber 35.

Accordingly, the first step in the method for forming the coupling is to constitute a die casting chamber within which the nipple is axially supported. All of the nipple, with the exception of the head, is telescoped in a die member which constitutes the annular space in the finished coupling receiving the hose end. Thus, when the die cast operation is complete, the coupling element shown in Figure 2 results.

In the next step the hose end is inserted in the annular chamber, the chamber being large enough for receiving the hose end with the appliance of very little pressure.

Thereupon, the ductile die cast sleeve is swaged upon the hose end and its grooved portion imbedded in the wire braiding. As heretofore stated, the chamber is large enough so that when the sleeve is swaged (Figure 4) to straighten the outer wall, ample pressure has been applied to imbed the die cast metal in the wire braiding. This pressure is not sufficient to break or rupture the inner rubber lining of the hose engaged upon the nipple.

In other words the metal displaced in swaging operation places sufficient holding pressure on the hose end. This result occurs automatically when the outer wall of the coupling has been swaged as shown in Figure 4.

Having described my invention, I claim:

The method forming a high pressure coupling consisting of the steps, of inserting the end of a rubber hose in the annular chamber of a coupling element the hose incorporating inner and outer layers of rubber and an inner layer of wire braiding with the outer layer of rubber removed where the hose is inserted in the coupling element, and the outer sleeve portion of the annular chamber being formed of zinc alloy or metal having similar ductility, initially providing the outer sleeve portion with a swageable outward projection extending along the outer sleeve wall adjacent the annular chamber and thereafter pressing the swageable projection of the coupling element upon the wire braiding so that the outer wall of the outer sleeve portion is straight longitudinally, there being sufficient metal in the swageable projection which is displaced and adequate pressure applied to imbed the inner wall of the sleeve in the wire braiding without rupturing the inner rubber lining lying between the wire braiding and the inner sleeve portion of the coupling.

CLYDE G. BUTLER.